June 20, 1950 R. D. McCOY 2,511,863

ERROR SIGNAL CONTROL SYSTEM

Filed April 15, 1944 2 Sheets-Sheet 1

INVENTOR
R. D. McCOY
BY H. H. Thompson
ATTORNEY.

June 20, 1950 R. D. McCOY 2,511,863

ERROR SIGNAL CONTROL SYSTEM

Filed April 15, 1944 2 Sheets-Sheet 2

INVENTOR
R. D. McCoy
BY [signature]
His ATTORNEY.

Patented June 20, 1950

2,511,863

UNITED STATES PATENT OFFICE 2,511,863

ERROR SIGNAL CONTROL SYSTEM

Rawley D. McCoy, Bronxville, N. Y., assignor to The Sperry Corporation, a corporation of Delaware Application April 15, 1944, Serial No. 531,277

20 Claims. (Cl. 318—30)

More particularly, my invention relates to a fine and coarse error signal system in which novel electronic means is provided for rendering either the coarse or the fine signal voltage effective in, for example, controlling a servomotor or other controllable devices.

Where it is desirable to provide a close and accurate control over a servomotor in operating a load or load shaft closely to follow a reference or input shaft, for example, fine and coarse error signal systems are employed. The signal voltage outputs, that is, a coarse error voltage and a fine error voltage are supplied to an amplifier which in turn is associated in controlling relationship with the servomotor. Coarse and fine signal systems of this character are usually arranged so that the coarse system provides a signal voltage which is directly proportional in amplitude to angular displacement of a data input shaft or reference member, and the fine error system supplies a signal voltage which in amplitude varies in some ratio such, for example, as 36:1 with respect to displacements of the input or control shaft. The particular ratio adopted in providing a fine error signal depends on the requirements of the work to be performed or the device in which it is designed to be incorporated.

Where both fine and coarse error signals are employed, as above indicated, and where no control is exercised over the signals, the interference between these signals may constitute a source of error. By eliminating such interference, the servomotor or other control device can be made to follow the reference member much more accurately.

It is therefore the primary object of this invention to provide in a fine and coarse error signal system electronic means for rendering either the coarse or the fine error signal effective alone in its control over a servomotor.

Another object resides in providing electronic means which functions as a switching and amplifying means to supply the fine error voltage alone as the output of the coarse and fine error system for values of error below a predetermined, preferably small value, and to supply the coarse error voltage alone as the control output signal when the actual error exceeds said predetermined value.

It is another object of the present invention to provide electron tube means for controlling the fine and coarse error signal voltages, said means being so constructed and biased that one of the tubes is operable to bias the other tube beyond cut off when the actual error lies above or below a predetermined value.

It is a still further object of my invention to provide a pair of electron tubes, one of which is connected to control the fine error voltage and the other the coarse error voltage, said tubes being so relatively connected and arranged in an electrical circuit that the fine tube will operate to bias the coarse tube beyond cut off for actual errors below a predetermined value while the coarse tube will conduct and bias the fine tube beyond cut off when the error exceeds said predetermined value.

With the foregoing and other objects in view, my invention includes the novel elements and the combinations and relative arrangements thereof described below and illustrated in the accompanying drawings, in which.

Figure 1:
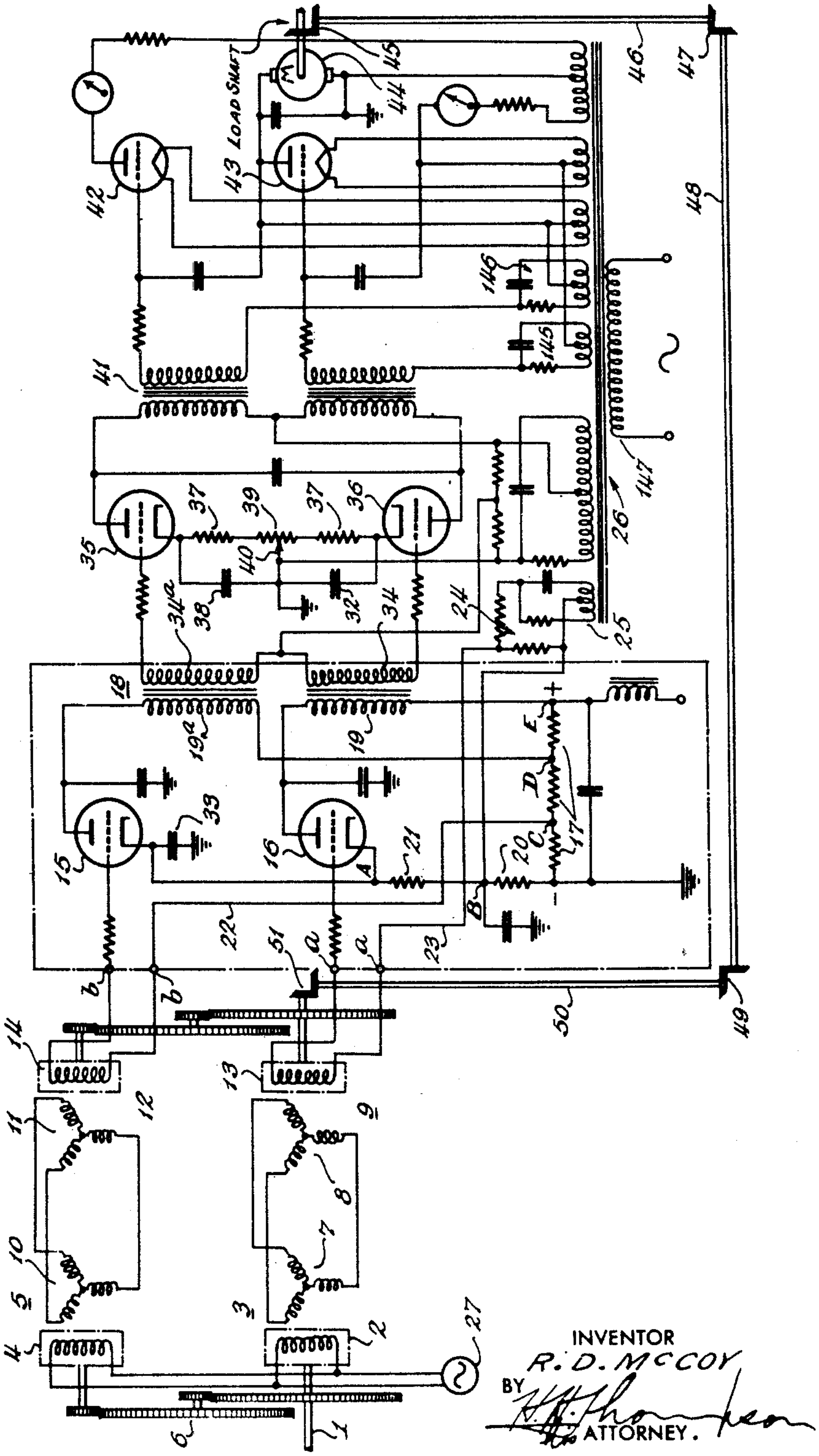
Fig. 1 is a wiring diagram illustrating the present invention embodied in a remote control, positional servo system.

Referring first to Fig. 1, wherein I have illustrated a system for operating a load shaft to following the angular movements of a reference shaft, the reference or input shaft is indicated at 1 and is directly coupled with the rotor 2 of a signal transmitter 3, herein illustrated as of the Selsyn or Autosyn type. The rotor 4 of a second or fine transmitter 5 is also driven from shaft 1 through a train of gears indicated generally at 6. In the embodiment illustrated, the rotor 2 of what may be termed the coarse transmitter is coupled directly with shaft 1 and therefore rotates in a 1:1 ratio therewith. The rotor 4 of the fine transmitter will rotate at, for example, a 36:1 or other desired ratio with respect to shaft 1, depending upon the ratio of the driving to driven members of the gear train. Although other types of signal transmitters and receivers may, of course, be employed, I will in the following refer thereto simply as Selsyn transmitters or receivers.

The polyphase stator 7 of the coarse Selsyn transmitter is connected in polyphase relation with the stator 8 of a coarse Selsyn receiver 9. Similarly, the stator 10 of the fine transmitter is connected with the stator 11 of the fine receiver 12. The rotor 13 of the coarse receiver is connected across the terminals *a—a* which are the input terminals to one of the electron tubes of the signal control circuit of the present invention. Likewise, the rotor 14 of the fine receiver is connected across the terminals *b—b* which are the input terminals of the other tube of the signal control circuit.

The circuit of the present invention which functions to control the supply of a coarse or fine error voltage to the servo amplifier is contained within the dot-dash enclosing line in Fig. 1, and comprises a pair of electron tubes 15 and 16. For purposes of description and in the claims, I have herein applied the terms "fine" tube and "coarse" tube to the two signal control, electron tubes. In the specification and drawings, these tubes are identified by numerals 15 and 16 and it will be understood that the fine tube is controlled by the fine signal voltage and the coarse tube is correspondingly controlled by the coarse signal voltage. Although these tubes are illustrated as separate triodes, a twin triode tube, pentodes or any other suitable type tube may be substituted therefor. The coarse signal voltage is applied to the grid of the coarse tube 16 and the fine signal voltage is supplied to the grid of the fine tube 15. A source of suitable electrical energy is connected as illustrated to supply a D. C. voltage across the voltage divider indicated generally at 17. The positive terminal E of the voltage divider is connected to the plate of tube 16 through one of the primary windings 19 of a coupling transformer 18. The plate potential for the plate of tube 15 is supplied from the point D on the voltage divider, preferably to provide a potential on the plate of tube 15 somewhat lower than that supplied to the plate of tube 16. The point D is connected through a second primary winding 19*a* of transformer 18 to the plate of tube 15. The negative terminal of the voltage divider which may be grounded, as shown, is connected through resistances 20 and 21 to the cathodes of both of the tubes. Furthermore, in the embodiment shown in Fig. 1, a bias is supplied to the grid of tube 15 by means of conductor 22 which is connected between one of the input terminals *b* and the point C on the voltage divider.

To complete the embodiment of the control circuit illustrated in Fig. 1, it will be noted that a bias is also supplied to the grid of tube 16 through conductor 23 which is connected between one of the input terminals *a* and the phase shifting circuit 24 which is illustrated as energized from one of the secondaries 25 of a transformer 26. The latter biasing potential is applied to the coarse tube 16 to prevent synchronization at any other point than at zero error, such as when the fine and coarse Selsyns are relatively 180° angularly displaced. The use of a biasing potential to prevent such synchronization is necessary when the ratio of the fine and coarse Selsyns is some even numbered ratio. When the ratio is an odd number, such as 15:1, no synchronizing point will exist except at zero error on both systems.

The operation of the circuit so far described is as follows. Upon angular rotation of the input shaft 1, rotors 2 and 4 of the coarse and fine Selsyn transmitters will be displaced relative to their associated stators. Each of the rotors 2 and 4 is connected across a suitable source of alternating potential, indicated at 27, and respectively control the direction of the resultant fields of the stators 8 and 11 of the Selsyn receivers. Signal voltages will, therefore, be induced in the rotors of the receivers which in amplitude will depend upon their positions with respect to the resultant fields of the stators. Assuming that the coarse and fine systems are operated on a 36:1 ratio, the amplitudes of the fine error voltage or the curve representing the envelope thereof will vary in a 36:1 ratio with respect to the amplitude or the envelope curve of the coarse voltage.

The fine and coarse error voltages are applied respectively to the grids of the tubes 15 and 16. At standby or zero error, the signal voltage control circuit is so arranged that the point B which lies intermediate the resistors 20 and 21 is negative with respect to point A which is common to the cathodes of both tubes. The voltage between A and C, for small errors, is such that tube 15 is biased correctly to operate as a conventional amplifier for the fine error signal, and for small error voltages the resistor 21 has a voltage drop thereacross which is sufficient to bias tube 16 beyond cut off thereby eliminating any coarse error signal in the output of transformer 18. The circuit is preferably so arranged that the voltage drop across resistor 21 is sufficient to bias tube 16 beyond cut off, for actual errors, for example, within 2° of zero. Therefore, for errors up to 2°, the tube 16 is rendered non-conducting. However, for such error values, tube 15 does conduct and a fine error signal is supplied in the output of transformer 18. The circuit is also so arranged in the biasing of the tubes that when the error exceeds the assumed 2° and the fine error signal approaches a maximum amplitude, tube 16 starts to conduct because the coarse error signal exceeds the voltage drop across resistor 21 and removes the bias otherwise applied to tube 16 by virtue of tube 15 conducting.

The additional current flow through resistor 21 due to tube 16 conducting functions to increase the voltage drop between A and B and as the error signal applied to the grid of tube 16 increases, point A will become more and more positive with respect to point B, and a greater difference voltage will exist between A and C which is the bias voltage on fine tube 15 causing tube 15 to cut-off. Through this action, the point A may become positive with respect to the plate of tube 15 and tube 15 will then be definitely cut out so that the fine signal will be eliminated from the output of transformer 18 and coarse signal alone will be supplied to the amplifier.

Figure 3:
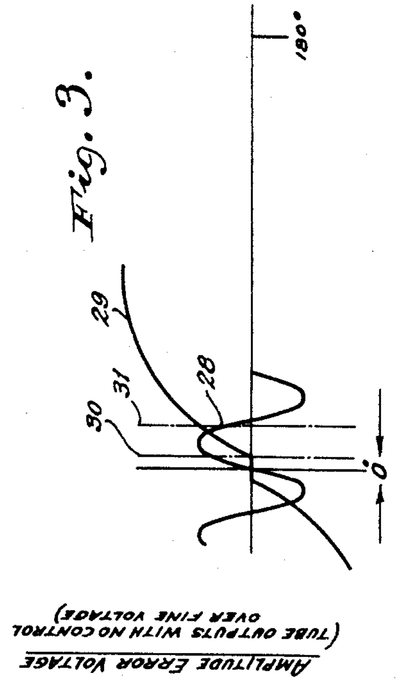
Fig. 3 represents the envelope of the fine and coarse signal voltage amplitude curves of the tube outputs, somewhat exaggerated for clearness of illustration.
Figure 4:
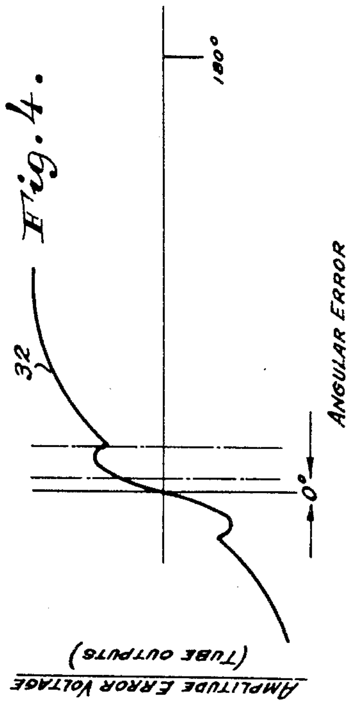
Fig. 4 is a view similar to Fig. 3, but depicting the curve of error voltage amplitudes supplied to the amplifier for controlling the servo.

In Fig. 3 I have shown curves representing the envelopes of the signal voltage which would be derived from the fine and coarse tubes if no control were exercised over the fine tube or no bias were to be applied in controlling relation thereto, and in Fig. 4 I have shown the envelope of the combined or the resultant of the voltage signals, derived from the fine and coarse tubes, which is supplied to the amplifier of the servo system. For exemplary purposes and to aid in a clear showing, the curves have been arranged to indicate a higher amplification by the coarse tube than by the fine tube.

By referring first to Fig. 3, it will be seen that the amplitude of the error voltage derived from the fine tube and indicated by the curve 28 varies substantially in a sinusoidal manner with changes in actual angular error and in a ratio thereto dependent upon the ratio of the fine to the coarse Selysn systems. In the absence of a control thereover as contemplated by this invention, the curve 28 would continue throughout 360° of actual error and will pass through zero with change in phase at zero degrees of error. As hereinabove described, the coarse tube is biased beyond cut off for values of actual error below a predetermined value and therefore the curve 29 which represents the envelope of the error voltage derived from the coarse tube does not change in phase at the zero error point, but reaches zero at some angular error therefrom.

Assuming that an actual error increases from zero, the coarse tube being biased beyond cut off will supply zero voltage until the error reaches some point represented by the dot-dash line 30 where the coarse error signal overrides the bias on the coarse tube. During this time, the error voltage output from the fine tube will in magnitude follow the curve 28. At some point of angular error represented by the dot-dash line 31, the coarse tube will bias the fine tube beyond cut off and thereafter only coarse error voltage will be supplied to the amplifier. The envelope of the voltage output from the circuit of my invention to the amplifier is illustrated in Fig. 4, where it will be observed that that portion of curve 32 lying between zero error and the error represented by the line 30 conforms to the similarly located portion of curve 28 in Fig. 3. Between the lines 30 and 31 the two voltages add together, and for values of error exceeding the error represented by line 31, curve 32 conforms to the corresponding portion of curve 29 of Fig. 3.

Figure 2:
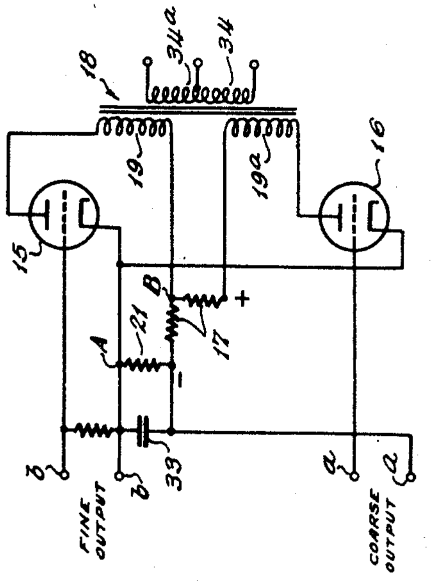
Fig. 2 is a wiring diagram of a modification.

In Fig. 2 I have shown a modified form of circuit which is generally similar to that shown in Fig. 1 and similar parts are represented by the same reference numeral. In this circuit, however, no bias is supplied from the voltage divider 17 to the grid of tube 15. The operation of this circuit is as follows: At zero error, point B is positive with respect to point A. Tube 15 operates as a conventional amplifier for the fine signal, while tube 16 will be rendered non-conductive because of the voltage drop between B and A caused by tube 15 conducting. This bias on tube 16 is so arranged that, preferably, as the fine signal output from tube 15 reaches a maximum, or somewhere in this zone of operation of tube 15, coarse tube 16 will be rendered conductive because the signal supplied thereto overcomes the bias. This additional current across the resistor 21 effects a reduction in the voltage drop between points A and B and finally reverses it so that the fine tube is rendered non-conductive and entirely cut off.

As compared to the latter described circuit, it will be noted that in the circuit of Fig. 1, in which a bias from the voltage divider is applied to the grid of tube 15, when tube 16 conducts, the bias on tube 15 is made more negative as well as, in effect, the plate voltage being reduced. In the circuits of Figs. 1 and 2, furthermore, the condenser 33 which is connected across resistor 21 is preferably of sufficient capacity as to make the system non-degenerative to the carrier frequency, but of insufficient capacity as to cause the fine or coarse signals to hang over during synchronization.

The outputs of tubes 15 and 16 are coupled through transformer 18 to a cathode rate stage, the secondaries 34 and 34a of transformer 18 being connected to supply signal voltages to the grids of tubes 35 and 36 in phase opposition. The cathode circuits of these tubes comprise resistors 37 and condensers 38, respectively, which function to provide cathode rates or signal voltages proportional to the rate of change of angular displacement error or a first derivative of said displacement error. A potentiometer 39 having a wiper 40 which is grounded, is preferably included for the purpose of removing unbalance in the circuit.

The output of the cathode rate stage, which includes voltages proportional approximately to displacement and rate of displacement, is coupled through transformer 41 to an ouput stage which comprises preferably two gas-discharge or Thyratron tubes 42 and 43. The plates of the two Thyratron tubes are operated in phase, while the voltage signals supplied from the secondaries of transformer 41 are applied in out-of-phase relation to the grids thereof, thereby providing a phase sensitive amplifier for controlling the operation of motor 44 which is connected in the plate circuits of the two tubes 42 and 43. In the embodiment herein shown, A. C. biasing voltages are derived from the circuits 145 and 146 which includes secondary windings of the transformer 26, the primary 147 of which is connected across a suitable source of alternating potential such as source 27, which is employed in exciting the Selsyn transmitters. Furthermore, in the embodiment shown, it will be observed that the armature of motor 44 is connected in series between the plates of the tubes 42 and 43.

The operation of the above-described circuit in its control over the motor 44 should be readily understood from the following brief description thereof. Assuming that the grids of the tubes 42 and 43 are of the same potential with respect to their respective filaments, equal currents will flow in each tube and in opposite directions through the motor 44. Since these currents will be equal, the difference current is zero and the motor will remain stationary. When the potential on one grid increases over that on the other, more current will flow in one direction through the motor armature than in the other, and the different current will cause the motor to rotate in one direction, the direction depending upon which grid has the higher potential or, in other words, upon the phase sense of the signal voltage with respect to the reference voltage derived through transformer 26. Furthermore, as the difference current supplied to the motor increases, the motor speed will correspondingly increase.

Where no other repeat back is provided, the load shaft connected with motor 44 may be arranged to drive the rotors of the Selsyn receivers 9 and 12 through, for example, bevel gears 45, shaft 46, bevel gears 47, shaft 48, bevel gears 49, shaft 50 and bevel gears 51. Obviously, any other desired means may be provided to afford a comparison of the positions of the load shaft and input shaft in the above-described system.

It will be observed that one of the principal advantages derived from a fine and coarse signal control system of the character hereinabove described resides in the fact that in the zones of small actual error wherein it is desirable to provide complete control over the servo by the fine signal, that the coarse signal is entirely absent, and, therefore, spurious error signals from the coarse Selsyn can in no way affect the precision with which the servomotor is controlled by the fine signal. Likewise, by eliminating the fine signal voltage when the error exceeds that below which the fine error alone is desired, errors due to interaction between the two signals cannot be present to affect the desired control.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. In a servomotor control system comprising a servomotor, fine and coarse electrical signal transmitters and receivers connected respectively one with the other, and an electronic control connected to control said motor and to receive the signal voltage outputs of said receivers, said control comprising electron tube means, one being connected to receive the error voltage output of the fine receiver only and another being connected to receive the error voltage output of the coarse receiver only, means for biasing the tube controlled by the coarse signal voltage beyond cutoff for small coarse error voltages but said coarse tube being rendered conductive by error voltages above a predetermined value, and means for combining the outputs of said electron tube means to provide a control voltage having magnitudes dependent upon the magnitudes of said fine and coarse error voltages.

2. In a servomotor control system comprising a servomotor, fine and coarse electrical signal transmitters and receivers connected respectively one with the other, and an electronic control connected to control said motor and to receive the signal voltage outputs of said receivers, said control comprising a fine and coarse electron tube, one being connected to receive the error voltage output of the fine receiver only and another being connected to receive the error voltage output of the coarse receiver only, the coarse tube being in cutoff condition for small coarse error voltages but rendered conductive by error voltages above a predetermined value, an amplifier, and means for combining the outputs of said fine and coarse electron tubes in like polarity sense and for supplying the resultant signal in controlling relation to said amplifier.

3. In a servomotor control system comprising a servomotor, fine and coarse electrical signal transmitters and receivers connected respectively one with the other, and an electronic control connected to control said motor and to receive the signal voltage outputs of said receivers, said control comprising a fine and coarse electron tube, one being connected to receive the error voltage output of the fine receiver only and another being connected to receive the error voltage output of the coarse receiver only, and means associated with and controlled by the fine tube for biasing the coarse tube beyond cutoff for values of coarse signal voltage below a predetermined value, and means for combining and supplying the outputs and said fine and coarse tubes as a control signal in said system.

4. In a servomotor control system comprising a servomotor, fine and coarse electrical signal transmitters and receivers connected respectively one with the other, and an electronic control connected to control said motor and to receive the signal voltage outputs of said receivers, said control comprising a fine and coarse electron tube, one being connected to receive the error voltage output of the fine receiver only and another being connected to receive the error voltage output of the coarse receiver only, and means for biasing the coarse tube beyond cutoff for values of coarse signal voltage below a predetermined value and for biasing the fine tube beyond cutoff for values of said coarse signal voltage above a predetermined value, and means for combining and supplying the outputs and said fine and coarse tubes as a control signal in said system.

5. In a servomotor control system comprising a servomotor, fine and coarse electrical signal transmitters and receivers connected respectively one with the other, and an electronic control connected to control said motor and to receive the signal voltage outputs of said receivers, said control comprising a fine and coarse electron tube, one being connected to receive the error voltage output of the fine receiver only and another being connected to receive the error voltage output of the coarse receiver only, and means including an impedance in circuit with the cathode of one tube for biasing the other tube beyond cut off, and means for combining and supplying the outputs and said fine and coarse tubes as a control signal in said system.

6. In a servomotor control system comprising a servomotor, fine and coarse electrical signal transmitters and receivers connected respectively one with the other, and an electronic control connected to control said motor and to receive the signal voltage outputs of said receivers, said control comprising a fine and coarse electron tube, one being connected to receive the error voltage output of the fine receiver only and another being connected to receive the error voltage output of the coarse receiver only, and impedance means in circuit with the cathode of said fine tube and the cathode of said coarse tube for biasing the fine tube beyond cut off when said coarse tube conducts, and means for combining and supplying the outputs and said fine and coarse tubes as a control signal in said system.

7. In a servomotor control system comprising a servomotor, fine and coarse electrical signal transmitters and receivers connected respectively one with the other, and an electronic control connected to control said motor and to receive the signal voltage outputs of said receivers, said control comprising a fine and coarse electron tube, one being connected to receive the error voltage output of the fine receiver only and another being connected to receive the error voltage output of the coarse receiver only, and means in circuit with the cathode of said coarse tube for biasing the fine tube beyond cut off when said coarse tube conducts, and means for combining and supplying the outputs of said fine and coarse tubes as a control signal in said system.

8. A system of the character recited in claim 7 in which said tubes and common impedance are so constructed, correlated and arranged that said impedances will render the normally positive plate of the fine tube negative with respect to its cathode for large coarse error signals applied to said coarse tube whereby positively to cut out said fine tube.

9. In a system comprising fine and coarse electrical signal transmitters and receivers connected respectively one with the other, a fine and coarse electron tube each having a plate, cathode and grid, means for connecting the grids of said fine and coarse tubes respectively with the fine and coarse signal receivers, an electrical circuit including said tubes, a source of potential connected in the plate cathode circuits of said tubes, and a common impedance connected in circuit with the cathode of both tubes, means for biasing said fine electron tube above cut off whereby it will conduct for small voltages applied thereto, said impedance being of such size order and the plate potentials being of such magnitude and relative values that the voltage drop across said impedance produced by the fine tube will bias the coarse tube beyond cutoff for small coarse signal voltages below a predetermined value and the voltage drop across said impedance produced by the coarse tube for values of coarse signal voltage applied thereto above a predetermined value will bias said fine tube beyond cutoff, and means for combining the outputs of the coarse and fine tubes.

10. In a system for supplying a voltage output dependent upon a pair of control signal voltages supplied thereto, an electrical circuit including a pair of electron tubes each having a plate and cathode, means connected respectively to receive said signal voltages for controlling the space discharge between plate and cathode in said tubes respectively in accordance with said signals, means for applying plate potentials to the plates of said tubes, the plate potential of a first of said tubes being less than that of the second tube, impedance means connected to the cathode of a first of said tubes and in the plate cathode circuit of a second of said tubes for driving the cathode of the first of said tubes more positive than its plate for values of signal voltage applied to the second of said tubes above a predetermined value, and means for combining the outputs of the coarse and fine tubes.

11. In a system for supplying a voltage output dependent upon a pair of control signal voltages supplied thereto, an electrical circuit including a pair of electron tubes each having a plate and cathode, means connected respectively to receive said signal voltages for controlling the space discharge between plate and cathode in said tubes respectively in accordance with said signals, means for applying plate potentials to the plates of said tubes, and means including an impedance connected with the cathode of both tubes and in the plate-cathode circuit of a first of said tubes so that the voltage drop thereacross is controlled by the said first tube for varying the effective voltage difference between the cathode and plate of the second of said tubes, means for biasing the control means of said second tube in a more positive direction than that of said first tube, the plate potential of said second tube being less than that of said first tube whereby conduction of said first tube for values of signal voltage applied thereto above a predetermined value causes the cathode of said second tube to go more positive than its plate, and means for combining the outputs of said electron tubes.

12. In a system for supplying a voltage output dependent upon a pair of control signal voltages supplied thereto, an electrical circuit including a pair of electron tubes each having a plate and cathode, means connected respectively to receive said signal voltages for controlling the space discharge between plate and cathode in said tubes respectively in accordance with said signals, means for applying plate voltages to the plates of said tubes, the plate potential of a first of said tubes being less than that of the second tube, and a common cathode impedance associated with said tubes, the voltage difference between the cathodes and plates of said two tubes being of such values and the impedance being of such size order that the second tube is operable for values of signal voltage applied thereto above a predetermined value to cause the cathode of the first tube to become more positive than its plate whereby to cause said first tube to cutoff.

13. A system of the character recited in claim 10, including means whereby the amplification provided by the first tube is greater than that of the second tube.

14. In a system of the character described comprising fine and coarse electrical signal transmitters and receivers connected respectively one with the other, a fine and coarse electron tube each having a plate and a cathode, means connected to receive said fine signal voltage only for controlling the space discharge in said fine tube and means connected to receive said coarse signal voltage only for controlling the space discharge in said coarse tube, a source of anode potential connected with said tubes, and means including a common impedance in circuit with the cathode of each tube, the plate potentials of said tubes being of such values and the impedance being of such size order that the voltage drop across said impedance produced by the fine tube will bias the coarse tube beyond cutoff for small coarse signal voltages below a predetermined value and the voltage drop across said impedance produced by the coarse tube for values of coarse signal voltage applied thereto above a predetermined value will render the cathode of the fine tube more positive than its plate, thereby cutting off said fine tube.

15. In a servomotor control system comprising a servomotor, fine and coarse electrical signal transmitters and receivers connected respectively one with the other and an electronic control connected to control said motor and to receive the signal voltage outputs of said receivers, said control comprising a fine and coarse electron tube each having a plate, cathode and control electrodes, the control electrode of the fine tube being connected to receive the error voltage output of the fine receiver only and the control electrode of the coarse tube being connected to receive the error voltage output of the coarse receiver only, a source of plate potential, the plate potential of said fine tube being less than that of said coarse tube, and a common cathode impedance connected in circuit with the cathodes of both tubes, said plate potentials being of such values and said impedance being of such size order that the voltage drop across said impedance produced by the fine tube will bias the coarse tube beyond cutoff for small coarse signal voltages below a predetermined value and the voltage drop across said impedance produced by the coarse tube for values of coarse signal voltage applied thereto above a predetermined value will cause the cathode of the fine tube to become more positive than its plate, thereby cutting off said fine tube.

16. A system of the character recited in claim 15 in which the fine tube provides greater amplification than the coarse tube.

17. In a system comprising fine and coarse electrical signal transmitters and receivers connected respectively one with the other, a fine and coarse electron tube each having a plate and cathode, means connected to receive the fine signal voltage for controlling the space discharge between plate and cathode of the fine electron tube, means connected to receive the coarse signal voltage for controlling the space discharge between plate and cathode in the coarse electron tube, an electrical circuit including said tubes, a source of potential connected in the plate-cathode circuits of said tubes, means for applying a positive bias to the control means of the fine tube, cathode impedance connected in circuit with the cathode of both tubes for biasing the coarse tube beyond cutoff for values of coarse signal voltage below a predetermined value, and means for combining the outputs of the fine and coarse tubes.

18. In a system comprising fine and coarse electrical signal transmitters and receivers connected respectively one with the other, a fine and coarse electron tube each having a plate and cathode, means connected to receive the fine signal voltage for controlling the space discharge between plate and cathode of the fine electron tube, means connected to receive the coarse signal voltage for controlling the space discharge between plate and cathode in the coarse electron tube, an electrical circuit including said tubes, a source of potential connected in the plate-cathode circuits of said tubes, means for applying a positive bias to the control means of the fine tube, and a common cathode impedance connected in circuit with the cathode of both tubes for biasing the coarse tube beyond cutoff for values of coarse signal voltage below a predetermined value, said coarse tube having a plate-cathode potential difference of such value that for values of coarse signal voltage applied thereto above a predetermined value the voltage drop across said impedance will be sufficient to bias said fine tube beyond cutoff, and means for combining the outputs of the fine and coarse tubes.

19. In a system comprising fine and coarse electrical signal transmitters and receivers connected respectively one with the other, a fine and coarse electron tube each having a plate, a cathode and control electrode, means for supplying the fine signal voltage output from the fine receiver to the control electrode of the fine electron tube and means for supplying the coarse signal voltage from the coarse receiver to the control electrode of the coarse electron tube, the control electrode of the fine tube having a more positive bias than that of said coarse tube, impedance means connected in the cathode plate circuit of both tubes for biasing the coarse tube beyond cut off for values of coarse signal voltage above a predetermined value, and means for combining the outputs of the coarse and fine tubes.

20. A system of the character recited in claim 18 together with means for applying a steady bias on the grid of said fine tube.

RAWLEY D. McCOY.

REFERENCES CITED

The following references are of record in the file of this patent:

UNITED STATES PATENTS

| Number | Name | Date |
|---|---|---|
| 1,985,982 | Edwards | Jan. 1, 1935 |
| 2,265,996 | Blumlein | Dec. 16, 1941 |
| 2,266,401 | Reeves | Dec. 16, 1941 |
| 2,328,056 | Cooley | Aug. 31, 1943 |
| 2,338,395 | Bartelink | Jan. 4, 1944 |
| 2,363,809 | Schade | Nov. 28, 1944 |
| 2,424,809 | Edwards | July 29, 1947 |